(12) United States Patent
Henkel

(10) Patent No.: US 8,094,065 B2
(45) Date of Patent: Jan. 10, 2012

(54) METHOD FOR PROCESSING A SET OF SIGNALS OF A GLOBAL NAVIGATION SATELLITE SYSTEM WITH AT LEAST THREE CARRIERS

(75) Inventor: Patrick Henkel, Emmering (DE)

(73) Assignee: Technische Universitaet Muenchen (DE)

( * ) Notice: Subject to any disclaimer, the term of this patent is extended or adjusted under 35 U.S.C. 154(b) by 0 days.

(21) Appl. No.: 12/564,766

(22) Filed: Sep. 22, 2009

(65) Prior Publication Data

US 2010/0073226 A1    Mar. 25, 2010

Related U.S. Application Data

(63) Continuation of application No. PCT/EP2008/053300, filed on Mar. 19, 2008.

(30) Foreign Application Priority Data

Mar. 22, 2007  (EP) .................................... 07005970
May 4, 2007  (EP) .................................... 07009091
Jul. 7, 2007  (EP) .................................... 07112009

(51) Int. Cl.
*G01S 19/44* (2010.01)
*G01S 19/32* (2010.01)
*G01S 19/33* (2010.01)
(52) U.S. Cl. .......... 342/357.27; 342/357.72; 342/357.73
(58) Field of Classification Search ............. 342/357.27, 342/357.72, 357.73
See application file for complete search history.

(56) References Cited

U.S. PATENT DOCUMENTS

| 2005/0101248 | A1 | 5/2005 | Vollath | |
| 2009/0027264 | A1* | 1/2009 | Chen et al. | 342/357.12 |
| 2009/0224969 | A1* | 9/2009 | Kolb | 342/357.04 |
| 2010/0253575 | A1* | 10/2010 | Vollath | 342/357.27 |

FOREIGN PATENT DOCUMENTS

WO    2006108227 A1    10/2006

OTHER PUBLICATIONS

R. Hatch, The synergism of GPS code and carrier phase ambiguities, Proceedings of the 3rd International Geodetic I Symposium on Satellite Doppler Positioning, vol. 2, p. 1213-1232, Feb. 1982.*

J. Jung et al., Optimization of Cascade Integer Resolution with Three Civil GPS Frequencies. Proceedings of the 13th International Technical Meeting of the Satellite Division of the Institute of Navigation, p. 2191-2200, Sep. 2000.*

(Continued)

*Primary Examiner* — Thomas Tarcza
*Assistant Examiner* — Fred H Mull
(74) *Attorney, Agent, or Firm* — St. Onge Steward Johnston & Reens LLC

(57) ABSTRACT

A method for processing a set of navigation signals of a global navigation satellite system with at least three carrier signals is disclosed in which the processing of the navigation signals is based on a linear combination of the carrier signals to a combined signal. The weighting coefficients are selected such that the combined phase signal is free from geometry and free from frequency-independent disturbance variables.

21 Claims, 6 Drawing Sheets

OTHER PUBLICATIONS

P. Teunissen et al., A Comparison of TCAR, CIR and LAMBDA GNSS Ambiguity Resolution. Proceedings of the 15th International Technical Meeting of the Satellite Division of The Institute of Navigation, Sep. 2002.*
H. Isshiki, An Application of Wide-Lane to Long Baseline GPS Measurements (3). Proceedings of the 16th International Technical Meeting of the Satellite Division of The Institute of Navigation, p. 2129-2141, Sep. 2003.*
S. Verhagen, On the Reliability of Integer Ambiguity Resolution, Navigation: Journal of the Institute of Navigation, vol. 52(2), p. 99-110, Summer 2005.*
W, Zhang, Triple Frequency Cascading Ambiguity Resolution for Modernized GPS and GALILEO, Department of Geomatics Engineering, UCGE Reports No. 20228, Jul. 2005.*
European Search Report; EP 07 11 2009; Nov. 28, 2007; 3 pages.
International Preliminary Report on Patentability and Written Opinion of the International Searching Authority; PCT/EP2008/053300; Sep. 29, 2009; 8 pages.
International Search Report; PCT/EP2008/053300; Jun. 24, 2008; 3 pages.
Teunissen, P.: "A canonical theory for short GPS baselines", Part I to Part IV, Journal of Geodesy, Springer-Verlag 1997; 62 pages.
Teunissen, P.: "A New Method for Fast Carrier Phase Ambiguity Estimation", 0-7803-1435-2/94, 1994 IEEE; 12 pages.
Collins, P.: An overview of GPS inter-frequency carrier phase combinations. In: UNB/GSD, 1999; 15 pages.
Simsky, A.; Sleewaegen, J.-M. and Nemrey, P.: Early performance results for new Galileo and GPS signals-in-space, European Navigation Conference, ENC GNSS 2006; 26 pages.
Galileo Joint Undertaking: Galileo Open Service, Signal in Space Interface Control Document (OS SIS ICD) Draft 0, European Space Agency, 2006; 192 pages.
Hoffmann-Wellenhoff, Lichtenegger and Collins.: "GPS—Theory and Practice", Springer, 5th edition, 2005; 5 pages.
P. Teunissen and A. Kleusberg, GPS for Geodesy, Springer, New York, 2nd edition, 1998; 4 pages.
Jung, J.: High Integrity Carrier Phase Navigation Using Multiple Civil GPS Signals. In: Ph.D. Thesis, University of Stanford, 2000; 169 pages.
Teunissen, P. and Tiberius, C.: "Integer Least-Squares Estimation of the GPS Phase Ambiguities", paper presented at the International Symposium on Kinematic Systems in Geodesy, Geomatics and Navigation, Banff, Alberta, Canada, Aug./Sep. 1994; 10 pages.
Henkel, P. and Günther, C.: Integrity Analysis of Cascaded Integer Resolution with Decorrelation Transformations. In: Proceedings of the Institute of Navigation, National Technical Meeting, San Diego, 2007; 8 pages.
Zhang, W. et al: "Investigation of Combined GPS/GALILEO Cascading Ambiguity Resolution Schemes" Proceedings of Ion GNSS-2003, Sep. 9, 2003, pp. 2599-2610, XP002460260 Portland, OR, USA p. 2601, section "Refined Geometry-free Cascading Ambiguity Resolution Steps".
Teunissen, P.: Least-squares estimation of the integer ambiguities, Invited lecture, Section I to IV, Theory and Methodology, IAG General Meeting, Beijing, China, 1993; 16 pages.
G. Strang and K. Borre, Linear Algebra, Geodesy, and GPS, Wellesley-Cambridge Press, 1997; 3 pages.
Teunissen, P.: Success probability of integer GPS ambiguity rounding and bootstrapping. In: Journal of Geodesy, vol. 72, pp. 606-612, 1998.
Cocard, M. and Geiger, A.: Systematic search for all possible widelanes. In: Proc. of 6th Intern. Geodetic Symposium on Satellite Positioning, 1992; 7 pages.
De Jonge, D. and Tiberius, C.: The LAMDA method for integer ambiguity estimation: implementation aspects in: LGR series, Delft University of Technology, pp. 1-49, 1996.
Feng, Y. and Rizos, C.: "Three Carrier Approaches for Future Global, Regional and Local GNSS Positioning Services: Concepts and Performance Perspectives" Proceedings of Ion GNSS-2005, Sep. 13, 2005, pp. 2277-2287, XP002460259, Long Beach, CA, USA p. 2279, section 2, up to "step 2: . . .".
Vollath, U. et. Al: Three or Four Carriers—How Many are Enough? In: Proc. of the Institute of Navigation (ION), Portland, USA, 2000; 11 pages.
Zhang, H.: Triple frequency Cascading Ambiguity Resolution for Modernized GPS and Galileo. In: UCGE Reports, No. 20228, 2005; 189 pages.
Kaplan, E.; Hegarty, C.: Understanding GPS—Principles and Applications, Artech House, 2nd edition, Norwood (MA), 2006; 3 pages.
G. Golub and C. Van Loan: Matrix computations, John Hopkins University Press, Baltimore (USA), 3rd edition, 1996; 4 pages.

* cited by examiner

US 8,094,065 B2

METHOD FOR PROCESSING A SET OF SIGNALS OF A GLOBAL NAVIGATION SATELLITE SYSTEM WITH AT LEAST THREE CARRIERS

CROSS-REFERENCE TO RELATED APPLICATIONS

The present application is a continuation of pending International patent application PCT/EP2008/053300 filed on Mar. 19, 2008, which claims priority of European application No. 07005970 filed on Mar. 22, 2007, priority of European application No. 07009091, filed on May 4, 2007 and priority of European application No. 07112009, filed on Jul. 7, 2007. The disclosure of this application is hereby incorporated by reference in its entirety, as part of the present disclosure.

FIELD OF THE INVENTION

The invention relates to a method for processing a set of navigation signals of a global navigation satellite system with at least three carrier signals in which the processing of the navigation signals is based on a linear combination of phase measurements of the carrier signals to a combined phase signal.

BACKGROUND OF THE INVENTION

Such a method is known from ZHANG, H.: Triple frequency Cascading Ambiguity Resolution for Modernized GPS and Galileo. In: UCGE Reports, No. 20228, 2005. According to the known method three frequency linear combinations for Galileo are proposed. A stringent bound on the weighting coefficients, however, prevented the generation of new widelane combinations above 0.90 m.

Currently three global navigation satellite systems are used or proposed: The global positioning system (GPS), Glonass, and the proposed Galileo system. The global navigation satellite systems are based on navigation satellites which emit carrier signals in the higher frequency range. A periodical code sequence and a navigation message are modulated on the carrier signals. Based on the code sequence and the navigation message a positioning process of a navigation device can be performed. The accuracy of the positioning can considerably be enhanced if the high frequency carrier signal is used for the positioning process besides the code signal. For instance, within GPS, the wavelength of the carrier signal $L_1$ amounts to 19.0 cm compared to 300 m of a code chip. In consequence an accuracy improvement by a factor of 1500 is to be expected.

One disadvantage of a positioning process using the carrier signals is the ambiguity of the phase since the carrier signal contains no information on the integer number of wavelengths between the navigation device and the satellite. Therefore, the phasing is unknown.

Furthermore, it has to be taken into account, that the carrier signal pass through the earth's atmosphere particular through the ionosphere. In consequence the carrier signals show a so called ionospheric error. Further error sources are the phase noise of the carrier signal, the orbital error of the satellite as well as the clock error of the navigation device and the satellite.

The clock errors can be eliminated by the double difference method in which the position of the navigation device with respect to a reference station is determined by considering the differences between current difference signals from different satellites, wherein the difference signals are formed by the differences between the signals emitted by a specific satellite but received from the navigation device and the reference station. In addition ionospheric and tropospheric errors are significantly attenuated for short baselines if the double difference method is used.

In general, the phase ambiguity is resolved by estimating the phasing. The reliability of the estimate depends among other things on the relation between the wavelength of the carrier signal and the deviations resulting from the other error sources. Typically, the ionospheric error results in a spatial error of a few meters, whereas the phase noise affects the results of the phase estimation by a few millimeters.

The carrier phase measurements are highly accurate but ambiguous measurements. Numerous approaches have been suggested for integer ambiguity resolution.

TEUNISSEN, P.: Least-squares estimation of the integer ambiguities, Invited lecture, Section Ito IV, Theory and Methodology, IAG General Meeting, Beijing, China, 1993 discloses a least square estimation method for resolving phase ambiguities. This approach is also called the LAMBDA (=Leastsquares Anbiguity Decorrelation Adjustment)-method.

DE JONGE, D. and TIBERIUS, C.: The LAMBDA method for integer ambiguity estimation: implementation aspects In: LGR series, Delft University of Technology, pp. 1-49, 1996 discloses further details on the implementation of a least square estimation method for resolving phase ambiguities.

Details on methods for resolving the phase ambiguity can also be found in HENKEL, P. and GÜNTHER, C.: Integrity Analysis of Cascade Integer Resolution with Decorrelation Transformations. In: Proceedings of the Institute of Navigation, National Technical Meeting, San Diego, 2007 and in US 2005/101248 A1.

The reliability of integer estimation is validated by the success rate disclosed in TEUNISSEN, P.: Success probability of integer GPS ambiguity rounding and bootstrapping. In: Journal of Geodesy, Vol. 72, pp. 606-612, 1998. or by a comparison between the error norms of the best and second-best integer candidates as disclosed in VERHAGEN, S.: On the Reliability of Integer Ambiguity Resolution. In: Journal of the Institute of Navigation, Vol. 52, No. 2, pp. 99-110, 2005.

By combining carrier signals a combined signal can be generated which comprises a significantly greater wavelength than the single carrier signals. For instance, the difference between the carrier signals $L_1$ and $L_2$ results in a combined signal with a wavelength of 86.2 cm, which is therefore referred to as widelane (WL). The sum of the carrier signals $L_1$ and $L_2$ results in a combined signal with a wavelength of 10.7 cm, which is referred to as narrowlane (NL).

A systematic search of all possible widelane combinations of L1 and L2 is disclosed in COCARD, M. and GEIGER, A.: Systematic search for all possible widelanes. In: Proc. of 6th Intern. Geodetic Symposium on Satellite Positioning, 1992. The widelane combination and the narrowlane combinations are characterized by the noise amplification, the amplification of the ionospheric error and by the amplification of the multipath error.

In COLLINS, P.: An overview of GPS inter-frequency carrier phase combinations. In: UNB/GSD, 1999 a method for a systematic search for GPS inter-frequency carrier phase combinations is disclosed. Ionospheric, noise and multipath characteristics are computed for both widelane and narrowlane L1-L2 combinations.

VOLLATH, U. et. Al: Three or Four Frequencies-How many are enough? In: Proc. of the Institute of Navigation (ION), Portland, USA, 2000 describes the reliability of ambiguity resolution for navigation systems with four carriers.

For resolving the phase ambiguity an iterative approach is used. In the beginning, the phase is estimated using a combined signal with the greatest wavelength. In subsequent iteration steps, further combined signals with stepwise decreasing wavelength are considered. In each iteration step the phasing is estimated wherein the information on the phasing gained in previous iteration steps can be used in subsequent iteration steps. This approach is often referred to as CIR(=Cascade Integer ambiguity Resolution). The cascade integer ambiguity resolution is based on different widelane combinations. The integer estimation simplifies with increased wavelength which is of special interest in Wide Area Real-Time Kinematics (WARTK) due to different ionospheric conditions at the user and reference location.

In JUNG, J.: High Integrity Carrier Phase Navigation Using Multiple Civil GPS Signals. In: Ph.D. Thesis, University of Stanford, 2000 three frequency linear combinations for GPS and extended CIR are analyzed by ionospheric gradient estimation.

The disadvantage of the prior art cascade integer ambiguity resolution is the repetitive estimation of the baseline which is a nuisance parameter in all steps except the last one. This motivates the use of geometry-free widelane combinations.

The most simple geometry-free combinations are obtained by subtracting phase measurements of two different frequencies. The E5a-E5b combination benefits from a significant reduction of the ionospheric error but shows a severe drawback: The superposition of ambiguities can no longer be expressed as an integer multiple of a single wavelength.

SIMSKY, A.; SLEEWAEGEN, J.-M. and NEMREY, P.: Early performance results for new Galileo and GPS signals-in-space, European Navigation Conference, describe a so called multipath-combination which removes geometry portion, ionospheric and tropospheric errors but suffers again from the loss of integer nature.

KAPLAN, E.; HEGARTY, C.: Understanding GPS—Principles and Applications, Artech House, 2nd edition, Norwood (Mass.), 2006 and European Space Agency (ESA) and Galileo Joint Undertaking (GJU), GAL OS SIS ICD, May 2006 contains considerations on possible error sources.

SUMMARY OF THE INVENTION

Proceeding from this related art, the present invention seeks to provide an improved method for processing a set of navigation signals of a global navigation satellite system with at least three carrier signals.

This object is achieved by a method having the features of the independent claim. Advantageous embodiments and refinements are specified in claims dependent thereon.

In the method the phase ambiguity of the combined signal is an integer multiple of the combined wavelength associated with the combined signal. Furthermore the combined signal is free from geometry and from frequency-independent disturbance variables. Therefore the remaining significant unknowns are the phase ambiguities and the ionospheric error. These unknowns can be estimated if the estimation process is based on a sufficient number of phase measurements. Since the ionospheric error is also estimated the position of the navigation device can be determined absolutely without using parallel measurements of a reference station.

In one embodiment the linear combination eliminates the tropospheric error, the clock errors of the satellite as well as the orbital errors of the satellites, so that the number of disturbance variables is significantly reduced.

In another embodiment a combination matrix containing the weighting coefficients of the linear combinations of the carrier signals has a rank corresponding to the number of combined signals. Thus the combination matrix can be inverted to obtain the elementary phase ambiguities associated with the carrier signals.

Preferably N−1 geometry-free linear combinations of N phase measurements of the carrier signals are used together with at least one difference measurement containing the phase difference between a geometry conserving phase measurement and a code measurement. In such an embodiment the rank deficit of geometry-free combinations can be compensated with an additional phase measurement which is also free from frequency-independent disturbance variables.

The phase ambiguity and the ionospheric error can be estimated by minimizing a norm with respect to an inverse covariance matrix of the measurements. Thus a modified least square method can be used, in which the ionospheric error takes the role of the baseline.

The estimation process can further be continued by searching for a decorrelation transformation minimizing the off-diagonal elements of a covariance matrix of the estimated phase ambiguities and conserving integrity during back transformation. Thus the reliability of the estimation process can be significantly improved because the distance of the phase ambiguities in the space of unknown space ambiguities is increased so that erroneous estimation results become less likely.

Subsequently the decorrelated phase ambiguities are rounded to integer numbers and back transformed by the inverse matrix of the decorrelation transformation. Thus the estimation process results in integer phase ambiguities. Since the decorrelation transformation is constructed such that the integer number found for the phase ambiguities remain integer numbers while subjected to the inverse decorrelation transformation the estimation process result in integer number for the phase ambiguities.

In a preferred embodiment, a combination matrix, which minimizes the maximum variance of the decorrelated estimated phase ambiguities, is used for the linear combination of the phase measurements. Thus the probability of an erroneous estimation is reduced.

It is even possible to implement an error blocking process by using a combination matrix which minimizes the probability for the non-detection of a fault estimation after back-transforming the decorrelated integer phase ambiguities. In such an embodiment, an erroneous estimation can be detected by phase ambiguities which result in float numbers if the inverse combination matrix is applied. If a float number occurs the estimated phase ambiguity can be rejected as incorrect.

The variance of decorrelated phase ambiguities can also be used as criterion for a judgment whether an estimated value for the phase ambiguity should be accepted. If the variance of the decorrelated phase ambiguities lies below a predetermined threshold value the estimated value is fixed and further phase measurements are used to estimate the remaining phase ambiguities while keeping the fixed value unchanged. Thus the number of variables can successively be reduced.

Furthermore second order disturbance variables can also be taken into account. For instance, the influence of neglecting a second order ionospheric error on the estimation of the first order ionospheric error can be checked. The second order ionospheric error is estimated if the negligence of the second order ionospheric error results in an error of the estimation of the first order ionospheric error which surpasses the error of the estimation of the first order ionospheric error if both ionospheric errors are taken into account.

BRIEF DESCRIPTION OF THE DRAWINGS

Further advantages and properties of the present invention are disclosed in the following description, in which exemplary embodiments of the present invention are explained in detail on the basis of the drawings.

DETAILED DESCRIPTION OF THE INVENTION

Figure 1:
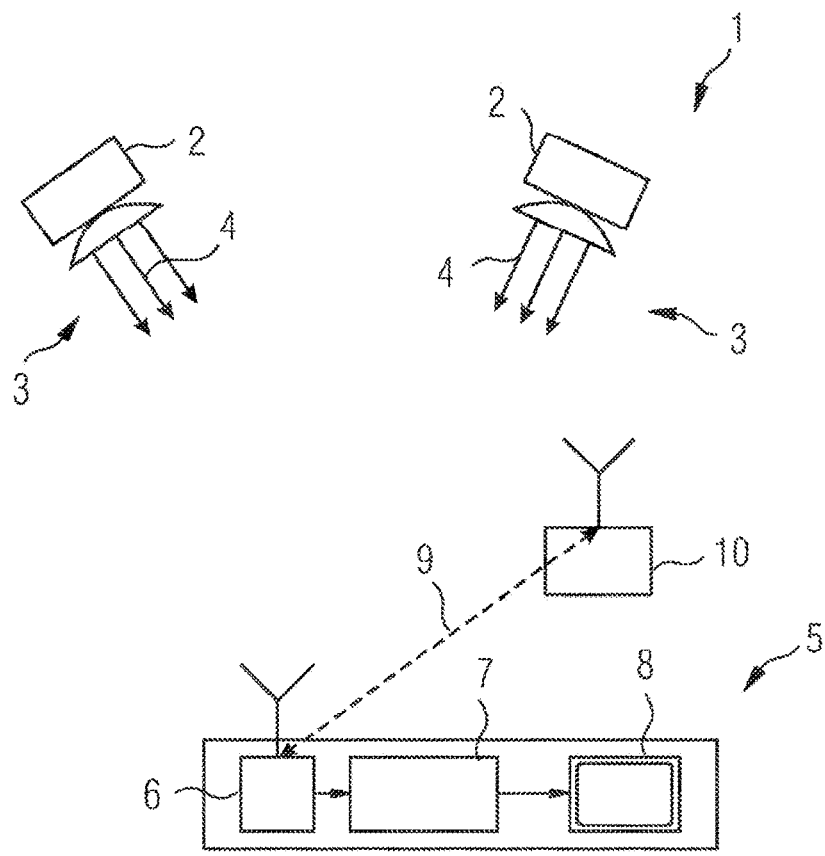
FIG. 1 depicts a navigation device for a global navigation satellite system.

FIG. 1 shows a global navigation satellite system 1 which comprises satellites 2 orbiting around the earth and emitting navigation signals 3 modulated on a number of carrier signal 4.

A navigation device 5 comprises a receiver 6 which is connected to a signal processor 7. The signal processor 7 processes the navigation signal 3 received from the satellites 2 and display the results on a display 8 of the navigation device 5.

For determining the position of the navigation device 5 various methods can be used. In the double difference method the length d of a baseline vector 9 between the navigation device 5 and a reference station 10 is determined by considering the differences between current difference signals from different satellites 2, whereas the difference signals are formed by the differences between the signals emitted by a specific satellite 2 but received from the navigation device 5 and the reference station 10. The distance between the navigation device 3 and the reference station 13 is also called the baseline.

In the following geometry-free combinations are deduced that remove all frequency-independent parameters, for instance the geometry portion, the user and satellite clock error, and the tropospheric error, and maintain the integer nature of ambiguities. The use of four frequency combinations is suggested due to a much larger variety of combinations that reduce the ionospheric delay for wavelength up to 10 m. Moreover, geometry-free combinations enable the ionospheric delay estimation with millimeter accuracy as all other error sources have been removed previously.

1. Variance of Carrier Phase Noise

In the following, it is shown that the variance of carrier phase noise is in the range of 1 mm for typical values of loop bandwidth and predetection integration time. The typical values used herein are taken from Kaplan and Hegarty and from European Space Agency (ESA) and Galileo Joint Undertaking (GJU), GAL OS SIS ICD, May 2006.

The standard deviation of the carrier phase tracking error due to thermal noise in the PLL is given by Kaplan and Hegarty as $$\sigma_\phi^i = \frac{\lambda}{2\pi} \sqrt{\frac{B_n}{C^i/N_0}\left(1+\frac{1}{2TC^i/N_0}\right)}, \tag{1}$$

with the wavelength $\lambda$, the (carrier) loop noise bandwidth $B_n$, the carrier to noise power ratio $C^i/N_0$ of satellite i and the predetection integration time T. The loop bandwidth and predetection time are given by the receiver hardware. The carrier to noise power ratio of satellite i is separated as $$(C^i/N_0)_{dB}=(C^i)_{dB}-(N_0)_{dB}, \tag{2}$$

with the recovered signal power $C^i$ received from satellite i in dBW and the thermal noise power component $N_0$ in a 1 Hz bandwidth (dBW). The recovered signal power $C^i$ is split into three terms:

$$(C^i)_{dB}=(C^i_R)_{dB}+(G^i_S)_{dB}-(L)_{dB}, \tag{3}$$

with the received signal power CiR, the receiver antenna gain GiS towards satellite i and the receiver implementation loss L (for example due to A/D conversion).

The User minimum received power above 10±elevation [dBW] (based on an ideally matched and isotropic 0 dBi antenna and lossless atmosphere) amounts to −155.0 dBW. If the atmospheric pass loss −0.5 dB, the receiver antenna gain between 3 dBic and +1.5 dBic as well as the receiver implementation loss −2 dB is taken into account, the recovered signal power $(C^i)$dB amount to −160.5 to −156.0 dBW.

The thermal noise power component in a 1 Hz bandwidth (dBW) is computed in Kaplan and Hegarty as $$(N_0)_{dB}=10 \log_{10}(k_B(T_{ant}+T_{amp})) \tag{4}$$

with the Boltzmann constant kB, the antenna noise temperature Tant and the amplifier temperature Tamp. The latter is computed from the noise figure Nf:

$$T_{amp} = 290 \cdot \left(10^{\frac{(N_f)_{dB}}{10}} - 1\right). \tag{5}$$

If the antenna noise temperature is 100 K, the receiver noise figure at 290 K is 4.3 dB, the amplifier temperature 490.5 K, the thermal noise power $(N_0)$dB in 1 Hz bandwidth results in 200.9 dBW.

Consequently, the carrier to noise power ratio is in the range 40.4 to 44.9 dB-Hz for the minimum received power specified in the Galileo Open Service SIS ICD.

Figure 2:
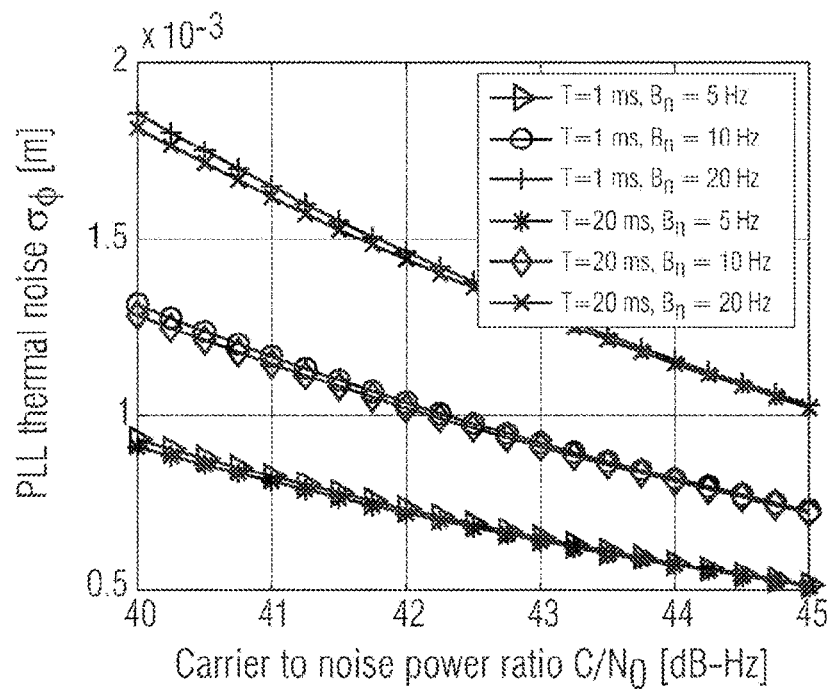
FIG. 2 shows a diagram with PLL thermal noise jitter for Galileo without RF interference.

FIG. 2 shows the standard deviation of the Galileo E5a tracking error ($\lambda$=24.58 cm) as a function of the carrier to noise power ratio for different loop bandwidths $B_n$ and predetection integration times T. Similar values for $B_n$ and T have been chosen by Kaplan and Hegarty. Obviously, the PLL thermal noise standard deviation is rather insensitive with respect to the predetection integration time. For a loop bandwidth of 5 Hz, the tracking error is in the range $\sigma_\psi$=0.5 mm to 0.9 mm.

2. Design of Geometry-Free Linear Combinations

The carrier phase measurements at the receiver are given by $$\lambda_q \phi_{u,q}^k(t) = \rho_u^k(t) + \delta\rho^k(t) + \quad (6)$$
$$c \cdot (\delta t_u(t) - \delta t^k(t-\tau)) - I_{u,q}^k(t) + T_u^k(t) + \lambda_q N_{u,q}^k(t) + \varepsilon_{\phi_{u,q}}^k(t)$$

with the following denotations:

$\rho_u^k(t)$ the navigation device to satellite range,
$\delta\rho^k(t)$ the orbital error of the satellite,
$c\delta t_u(t)$ the clock error of the navigation device,
$c\delta t^k(t-\tau)$ the clock error of the satellite,
$I_{u,q}^k(t)$ the ionospheric delay,
$T_u^k(t)$ the tropospheric delay,
$\lambda_w$ the wavelength,
$N_{u,q}^k(t)$ the integer ambiguity,
$\varepsilon_{\phi_{u,q}}^k(t)$ the phase noise, and the user u, satellite k, frequency q and epoch t. For simplicity, only the frequency index is kept. A (4F) linear combination of four phase measurements at four different frequencies is given by $$\lambda\phi = \alpha\lambda_1\phi_1 + \beta\lambda_2\phi_2 + \gamma\lambda_3\phi_3 + \delta\lambda_4\phi_4 \quad (7)$$
$$= \rho(\alpha + \beta + \gamma + \delta) + \alpha\lambda_1 N_1 + \beta\lambda_2 N_2 + \gamma\lambda_3 N_3 + \delta\lambda_4 N_4 -$$
$$I_1(\alpha + \beta q_{12}^2 + \gamma q_{13}^2 + \delta q_{14}^2) + \varepsilon$$
$$= \rho + \lambda N - I\eta + \varepsilon$$

with the weighting coefficients $\alpha$, $\beta$, $\gamma$ and $\delta$, the frequency ratios $q_{1z}=f_1/f_z$, $z\in\{2,3,4\}$ and the ionospheric delay $I_1$ occurring at $f_1$. The geometry free condition $$\alpha+\beta+\gamma+\delta=0 \quad (8)$$

removes all frequency-independent parameters, in particular the geometry, the clock errors and the tropospheric delay. The geometry free linear combination can be rewritten as $$\lambda\phi = \begin{pmatrix} \alpha\lambda_1 N_1 + \beta\lambda_2 N_2 + \\ \gamma\lambda_3 N_3 + \delta\lambda_4 N_4 \end{pmatrix} - (\alpha + \beta q_{12}^2 + \gamma q_{13}^2 + \delta q_{14}^2)I_1 + \tilde\varepsilon \quad (9)$$

The superposition of ambiguities can be characterized as an integer multiple N of a wavelength $\lambda$ if the following relation holds:

$$\alpha\lambda_1 N_1 + \beta\lambda_2 N_2 + \gamma\lambda_3 N_3 + \delta\lambda_4 N_4 = \lambda N. \quad (10)$$

The ambiguity of the geometry-free linear combination $$N = \underbrace{\frac{\alpha\lambda_1}{\lambda}}_{i} N_1 + \underbrace{\frac{\beta\lambda_2}{\lambda}}_{j} N_2 + \underbrace{\frac{\gamma\lambda_3}{\lambda}}_{k} N_3 + \underbrace{\frac{\delta\lambda_4}{\lambda}}_{l} N_4 \quad (11)$$

is $\{i, j, k, l\}\in\mathbb{Z}$. integer valued if Obviously, the weighting coefficients can be expressed as $$\alpha = \frac{i\lambda}{\lambda_1}, \beta = \frac{j\lambda}{\lambda_2}, \gamma = \frac{k\lambda}{\lambda_3}, \delta = \frac{l\lambda}{\lambda_4}. \quad (12)$$

The L1, E5b, E5a and E6 Galileo frequencies are specified as integer multiples of 10.23 MHz. Combining equations (8) and (12) yields the single requirement $$154i + 118j + 115k + 125l \stackrel{!}{=} 0, \quad (13)$$

where the common frequency factorization is taken into account. Note that equation (13) is independent of the wavelength. Once equation (13) is fulfilled for a set (i, j, k, l), it is also valid for (-i, -j, -k, -l). However, only linear independent combinations are beneficial. This requires:

$$gcd(i,j,k,l)=1 \quad (14)$$

with the function gcd(·) denoting the greatest common divisor. Assuming equal variances of phase noise for all frequencies, the noise and ionospheric amplifications (reductions) are given by:

$$A_n = \lambda \cdot \sqrt{\left(\frac{i}{\lambda_1}\right)^2 + \left(\frac{j}{\lambda_2}\right)^2 + \left(\frac{k}{\lambda_3}\right)^2 + \left(\frac{l}{\lambda_4}\right)^2} \quad (15)$$
$$A_I = \lambda \cdot \left| \frac{i}{\lambda_1} + \frac{j}{\lambda_2} \cdot q_{12}^2 + \frac{k}{\lambda_3} \cdot q_{13}^2 + \frac{l}{\lambda_4} \cdot q_{14}^2 \right|.$$

Both quantities increase linear with the wavelength. Geometry-free linear combinations can also be generated from only two frequencies, for example $\alpha+\beta=0$. The lowest integer weights are i=115 for E5b and j=−118 for E5a measurements which makes 2F geometry-free combinations useless due to catastrophic noise and ionospheric amplifications. Table I and II show the integer coefficients of selected 3F and 4F geometry-free combinations with reasonable noise/ionospheric amplification or reduction.

Figure 3:
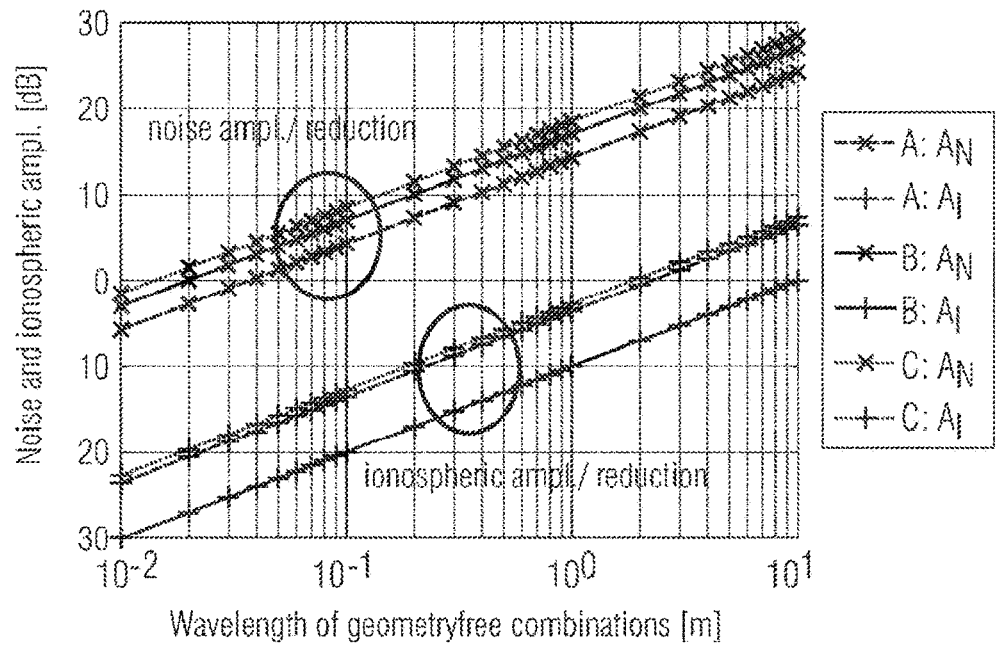
FIG. 3 illustrates the noise and ionospheric amplification/reduction as a function of the wavelength of geometry-free linear combinations.

These characteristics of the combinations A, B and C are depicted as a function of the wavelength of the linear combination in FIG. 3. The selection of the most suitable geometry-free combination might depend on the underlaying trade-off between noise amplification and ionospheric reduction, and current ionospheric conditions. The 4F geometry-free combination labeled B reduces the ionospheric error by a factor of more than 5 compared to the best 3F geometry-free combination (Table II).

Geometry-free combinations based on double difference measurements comprise a two-fold ionospheric reduction: The ionospheric impact is reduced by both differencing and linear combinations which allows the use of far longer baselines for equally reliable ambiguity resolution.

However, geometry-free linear combinations eliminate all clock errors and tropospheric delays which reduces the benefit of double difference measurements.

3. Rank-Deficiency of Geometry-Free Combinations

The determination of the four elementary L1, E5b, E5a and E6 phase ambiguities from the phase ambiguities of the geometry-free combinations requires four linear independent combinations. The 4×4 combination matrix M contains the weighting coefficients $[\alpha_r, \beta_r, \gamma_r, \delta_r]$, of the r-th combination in the r-th row. However, the geometry-free condition according to equation (8) makes one column linear dependent from the other columns. Therefore M is rank-deficient and the maximum achievable rank $R_{max}$ depends on the number of used frequencies Q, in particular $R_{max}=Q-1$.

Figure 4:
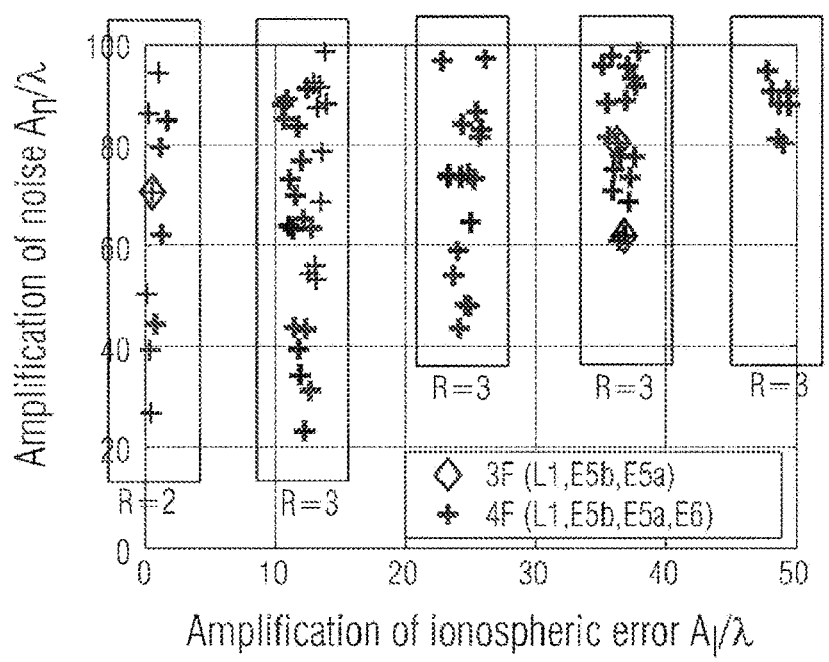
FIG. 4 depicts the rank deficiency of 3F and 4F geometry-free linear combinations with noise and ionospheric characteristics.

In FIG. 4, geometry-free combinations of similar noise and ionospheric characteristics are grouped in blocks. Only two linear independent geometry-free combinations exist in the first block of lowest ionospheric delay. The unambiguous determination of the elementary L1, E5b, E5a and E6 ambiguities therefore requires at least one geometry-free combination of the second block and at least one non geometry-free combination for overcoming the rank deficiency.

FIG. 4 also demonstrates the benefit of using 4F instead of 3F combinations: Due to the much larger variety in geometry-free combinations a noise reduction of up to 4.7 dB and an ionospheric attenuation of up to 7.3 dB can be achieved.

In the following full-geometry linear combinations are deduced, which can be used together with geometry-free combinations for avoiding the rank deficiency of the combination matrix.

4. Design of Full-Geometry Linear Combinations

The 4F full-geometry combination can be found departing from equation (7) with the weighting coefficients $\alpha$, $\beta$, $\gamma$ and $\delta$. These parameters are designed such that the geometry is preserved:

$$\alpha+\beta+\gamma\alpha\delta=1. \tag{16}$$

Moreover, the weighting coefficients are chosen such that the superposition of ambiguities can be written as an integer multiple N of a common wavelength $\lambda$:

$$\alpha\lambda_1 N_1 + \beta\lambda_2 N_2 + \gamma\lambda_3 N_3 + \delta\lambda_4 N_4 = \lambda N \tag{17}$$

The ambiguity of the linear combination is given by $$N = \underbrace{\frac{\alpha\lambda_1}{\lambda}}_{i} N_1 + \underbrace{\frac{\beta\lambda_2}{\lambda}}_{j} N_2 + \underbrace{\frac{\gamma\lambda_3}{\lambda}}_{k} N_3 + \underbrace{\frac{\delta\lambda_4}{\lambda}}_{l}. \tag{18}$$

N is integer valued if the following three sufficient but not necessary requirements are fulfilled:

$$\alpha = \frac{i\lambda}{\lambda_1}, \beta = \frac{j\lambda}{\lambda_2}, \gamma = \frac{k\lambda}{\lambda_3}, \delta = \frac{l\lambda}{\lambda_4} \text{ and } \{i,j,k,l\} \in Z. \tag{19}$$

Combing equations (16) and (19) yields the wavelength of the linear combination:

$$\lambda = \frac{1}{\frac{i}{\lambda_1} + \frac{j}{\lambda_2} + \frac{k}{\lambda_3} + \frac{l}{\lambda_4}} = \frac{\lambda_1\lambda_2\lambda_3\lambda_4}{i\lambda_2\lambda_3\lambda_4 + j\lambda_1\lambda_3\lambda_4 + k\lambda_1\lambda_2\lambda_4 + l\lambda_1\lambda_2\lambda_3}. \tag{20}$$

With the ordering $\lambda_1<\lambda_2<\lambda_3<\lambda_4$, the linear combination represents a widelane combination if $\lambda>\lambda_4$, or, equivalently:

$$\lambda_1\lambda_2\lambda_3 > i\lambda_2\lambda_3\lambda_4 + j\lambda_1\lambda_3\lambda_4 + k\lambda_1\lambda_2\lambda_4 + l\lambda_1\lambda_2\lambda_3 > 0, \tag{21}$$

which can be simplified to:

$$1 > iq_{14} + jq_{24} + kq_{34}l > 0. \tag{22}$$

For a given triple (i,j,k), the parameter l is uniquely determined by:

$$l = \lceil -(iq_{14} + jq_{24} + kq_{34}) \rceil. \tag{23}$$

where $\lceil \ \rceil$ denotes a rounding up process. Replacing l in equation (20) yields the wavelength $$\lambda(i,j,k) = \frac{\lambda_4}{iq_{14} + jq_{24} + kq_{34} + \lceil -(iq_{14} + jq_{24} + kq_{34})\rceil}. \tag{24}$$

This wavelength shows a three-fold cyclic relationship. The wavelength is in particular periodic with respect to i, j and k:

$$\lambda(i,j,k) = \lambda(i+P_i,j,k) \Leftrightarrow P_i q_{14} \in Z$$

$$\lambda(i,j,k) = \lambda(i,j+P_j,k) \Leftrightarrow P_j q_{24} \in Z$$

$$\lambda(i,j,k) = \lambda(i,j,k+P_k) \Leftrightarrow P_k q_{34} \in Z \tag{25}$$

with the periods $P_i$, $P_j$ and $P_k$.

In the following linear combinations of L1, E5a, E5b and E6 carrier phase measurements are considered. The Galileo frequencies are specified as L1: 154·10.23 MHz, $\lambda_1$=19.0 cm E6: 125·10.23 MHz, $\lambda_2$=23.4 cm E5b: 118·10.23 MHz, $\lambda_3$=24.8 cm E5a: 115·10.23 MHz, $\lambda_4$=25.5 cm, and the periods are obtained from equation (24) as $$P_i=115, P_j=23, P_k=115 \tag{26}$$

The range of the integer parameters i and j is centered around zero, for example i∈[−57, 57], j∈[−23, 23], k∈[−57, 57], and there exist 304175 partially dependent widelane combinations.

Two additional requirements are imposed for the computation of widelane combinations: First, the denominator of equation (20) must be non-zero and secondly, only linear independent combinations are of interest, so that:

$$gcd(i,j,k,l)=1, \tag{27}$$

with $gcd(\cdot)$ denoting the greatest common divisor.

Table III shows the integer coefficients of 4F widelane combinations with minimum noise amplification. Note the large number of widelane combinations with wavelength up to 29.3 m.

5. Combining Geometry-Free and Full-Geometry Linear Combinations

The inverse transformation of the combined phase ambiguities back to the elementary phase ambiguities requires a full rank combination matrix and thus the use of a non geometry-free linear combination. Instead of using a simple full-geometry combination a combination of a phase measurement with a code measurement is advantageously used. In particular, the geometry portion, clock and tropospheric errors can be eliminated by computing the difference between a full-geometry linear carrier phase combination and uncombined code measurements. However, the use of code minus carrier measurements demands ionospheric delay estimation due to code—carrier divergence. Further combinations are obtained from code measurements on different frequencies. The use of the same full-geometry linear combination is preferred to avoid the estimation of additional integer ambiguities. The set of both geometry-free and full-geometry linear combinations represents an over-determined system of equations:

$$\begin{bmatrix} \phi_A \\ \phi_B \\ \phi_C \\ \rho_1 - \phi_D \\ \rho_2 - \phi_D \\ \rho_3 - \phi_D \\ \rho_4 - \phi_D \end{bmatrix} = \underbrace{\begin{bmatrix} \lambda_A & 0 & 0 & 0 \\ 0 & \lambda_B & 0 & 0 \\ 0 & 0 & \lambda_C & 0 \\ 0 & 0 & 0 & -\lambda_D \\ 0 & 0 & 0 & -\lambda_D \\ 0 & 0 & 0 & -\lambda_D \\ 0 & 0 & 0 & -\lambda_D \end{bmatrix}}_{A} \cdot \begin{bmatrix} N_A \\ N_B \\ N_C \\ N_D \end{bmatrix} + \underbrace{\begin{bmatrix} -\eta_A \\ -\eta_B \\ -\eta_C \\ 1 + \eta_D \\ q_{12}^2 + \eta_D \\ q_{13}^2 + \eta_D \\ q_{14}^2 + \eta_D \end{bmatrix}}_{\Lambda} \cdot I_1 + \tilde{\varepsilon}, \quad (28)$$

where A, B and C denote three geometry-free combinations and D is the label of the full-geometry combination. $\eta_r$ characterizes the ionospheric amplification according to equation (50).

6. Modified LAMBDA-Algorithm: Estimation of Ambiguities and Ionospheric Error

The set of equations (28) is highly correlated due to repetitive use of carrier phase measurements. In general, the linear combinations $\Phi_A \ldots \Phi_D$ can be computed from the elementary as well as double differenced carrier phase measurements. Geometry-free combinations of elementary carrier phase measurements are used for absolute positioning and enable accurate estimation of the absolute ionospheric delay and absolute integer ambiguities. On the contrary, geometry-free combinations of double difference carrier measurements suppress the ionospheric delay by differencing for short baselines and restrict the estimation process to the estimation of double differenced integer ambiguities.

The noise vector of the three generalized geometry-free combinations in equation (28) is modelled as $$\tilde{\varepsilon} \sim N(0, \sigma_\phi^2 \cdot C_1 \otimes C_2) \quad (29)$$

where N denotes the zero-mean standard normal distribution $\sigma_\phi^2$ denotes the phase variance and $\otimes$ the Kronecker product defined in G. Golub and C. Van Loan: Matrix computations, John Hopkins University Press, Baltimore (USA), 3rd edition, 1996. C1 and C2 represent the correlation due to linear combinations and double differences given by G. Strang and K. Borre, Linear Algebra, Geodesy, and GPS, Wellesley-Cambridge Press, 1997:

$$C_1(i,j) = \alpha_i \alpha_j + \beta_i \beta_j + \gamma_i \gamma_j + \delta_i \delta_j, \; \{i,j\} \in \{1,2,3\} \quad (30)$$

$$C_2(i,i) = 4, \; \forall i \in \{1, \ldots, N_\epsilon - 1\}$$

$$C_2(i,j) = 2, \; \forall i \neq j, \quad (31)$$

where NS denotes the number of commonly visible satellites.

For geometry-free combinations of elementary carrier phase measurements, the noise term simplifies to:

$$\tilde{\varepsilon} \sim N(0, \sigma_\psi^2 \cdot C_1)$$

It should be noted that the covariance matrix of the combined set (28) also includes the variance of code measurements $\sigma_\rho^2$ and the correlation between geometry-free and full-geometry phase combinations.

Geometry-free combinations of elementary carrier phase measurements realize the main benefit of double differences which is the elimination of the clock errors. Moreover, the use of elementary measurements avoids the noise amplification of double differencing. Consequently, geometry-free combinations of double differenced carrier phase measurements might be used for differential positioning with short baselines but for long baselines the positioning is preferably based on absolute carrier phase measurements, since in the context of geometry-free combinations with ionospheric delay estimation, the use of double difference measurements is senseless and only increases the noise level. The further analysis therefore refers to absolute positioning.

The over-determined system of equations (28) enables the estimation of both the ambiguity vector $N = [N_A, N_B, N_C, N_D]^T$ and the ionospheric delay $I_1$.

The LAMBDA algorithm introduced by Teunissen is used for ambiguity estimation in the context of the double difference method and can also be used in this context although the parameters have a different interpretation: The baseline is replaced by the ionospheric delay and the correlation is caused by linear combinations instead of double differences.

Ambiguities and ionospheric delays are commonly estimated from the set $\phi_{LC}$ of geometry-free or full geometry linear combinations and the float solution is given by $$\hat{\psi} = \arg\min_{\psi} \left\| \phi_{LC} - \underbrace{[A \; \Lambda]}_{X} \underbrace{\begin{bmatrix} N \\ I \end{bmatrix}}_{\psi} \right\|_{\Sigma^{-1}}^2, \quad (32)$$

where $\Sigma$ denotes the covariance matrix of $\phi LC$. The covariance matrix of the float solution $\hat{\psi}$ can be written as $$\Sigma_{\hat{\psi}} = (X^T \Sigma^{-1} X)^{-1} = \begin{bmatrix} \Sigma_{\hat{N}} & \Sigma_{\hat{N}\hat{I}} \\ \Sigma_{\hat{I}\hat{N}} & \Sigma_{\hat{I}} \end{bmatrix}, \quad (33)$$

where all sub-matrices are strongly correlated. The integer decorrelation/permutation transformation $Z^T$ according to de Jonge and Tiberius is applied to the float ambiguities $\hat{N}$. The decorrelation transformation is constructed such that off-diagonal elements are minimized and that the inverse transformation preserves integer number. The covariance matrix of the transformed ambiguities is given by $$\Sigma_{\hat{N}'} = Z^T \Sigma_{\hat{N}} Z. \quad (34)$$

For reducing the probability of an erroneous estimation of the phase ambiguities a min-max-optimization can be used for choosing the combination matrix M for the geometry-free and full-geometry combinations. In particular the coefficients of the combination matrix are chosen such that the maximum variance of the covariance matrix of the transformed ambiguities is at a minimum:

$$M_N = \arg \min_M \max_i (E_{\hat{N}'}(i,i)). \quad (35)$$

In other words: The maximum diagonal element of the covariance matrix must be at a minimum in order to minimize the probability of an erroneous estimation.

The optimization has been performed over all full-rank combinations from Table II and III. The wavelength of all geometry-free combinations is assumed 20 cm and the result for $\sigma_\psi = 0.5$ mm, $\sigma_\rho = 0.5$ m and $N_{ep} = 1$ is given by $$M_N^{(I)} = \begin{bmatrix} i_1 & j_1 & k_1 & l_1 \\ i_2 & j_2 & k_2 & l_2 \\ i_3 & j_3 & k_3 & l_3 \\ i_4 & j_4 & k_4 & l_4 \end{bmatrix} = \begin{bmatrix} 1 & 0 & -13 & 12 \\ 5 & 5 & -5 & -7 \\ 2 & 4 & -1 & -6 \\ 1 & -4 & 1 & 2 \end{bmatrix} \quad (36)$$

where the first three rows denote the integer coefficients of the L1, E6, Eb5 and E5a ambiguities of the geometry-free combinations and the last row refers to full-geometry combination.

Vollath et al. measure the reliability of integer ambiguity resolution by the success rate, or equivalently, by the number of nines within the probability value. Similarly the reliability of the modified LAMBDA-method using the optimized combination matrix $M^N$ can be expressed as:

$$\text{Nines} = -\log_{10}(1 - \int_{-0.5}^{+0.5} p(x) dx) \quad (37)$$

In Equation (37) p(x) is a normal distribution of variance $$\min_M \max_i \Sigma_{\check{N}'}(i,i)$$

that results in the probability for a correct estimation if integrated between the rounding boundaries −0.5 and 0.5.

Figure 5:
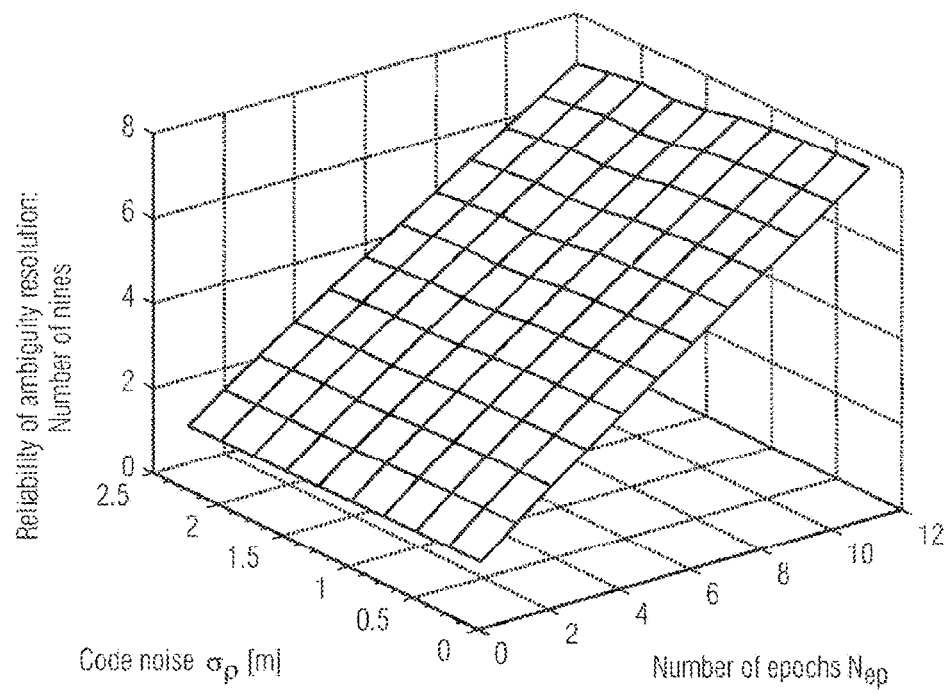
FIG. 5 depicts the reliability of the integer ambiguity resolution for min-max-optimized combinations of geometry-free and full-geometry 4F linear combinations.

FIG. 5 visualizes the reliability of the integer ambiguity reduction for min-max-optimized combinations as a function of the code noise $\sigma_\rho$ and number $N_{ep}$ of measurement epochs for $\sigma_\psi$=0.5 mm. The proposed scheme fulfils highest integrity requirements for $N_{ep} \geq 10$ and is insensitive with respect to a large range of code noise $\sigma_\rho$.

The sensitivity of nines according to equation (37) is quite low with respect to different combinations. For instance, if the phase noise $\sigma_\psi$=0.5 mm, the code noise $\sigma_\rho$=0.5 m and the number of epochs $N_{ep}$=1, a fraction of 86.4% of all tested combinations show a variance $\max_i(\Sigma_{\check{N}'}(i,i))$ not more than 10% above the minimum one of all combinations.

The integer search disclosed in P. Teunissen and A. Kleusberg, GPS for Geodesy, Springer, New York, 2nd edition, 1998, is omitted and the transformed ambiguities are directly rounded and backtransformed:

$$\check{N} = (Z^T)^{-1} [\check{N}'] \quad (38)$$

Where {ˆ,ˇ} denotes {float, fixed} ambiguities and ' indicates the space of decorrelated transformed phase ambiguities.

If the phase ambiguities have been correctly estimated the covariance of the ionospheric delay estimation reduces to:

$$\Sigma_{\hat{I}|\check{N}=N} = (\Lambda^T \Sigma^{-1} \Lambda)^{-1}. \quad (39)$$

Figure 6:
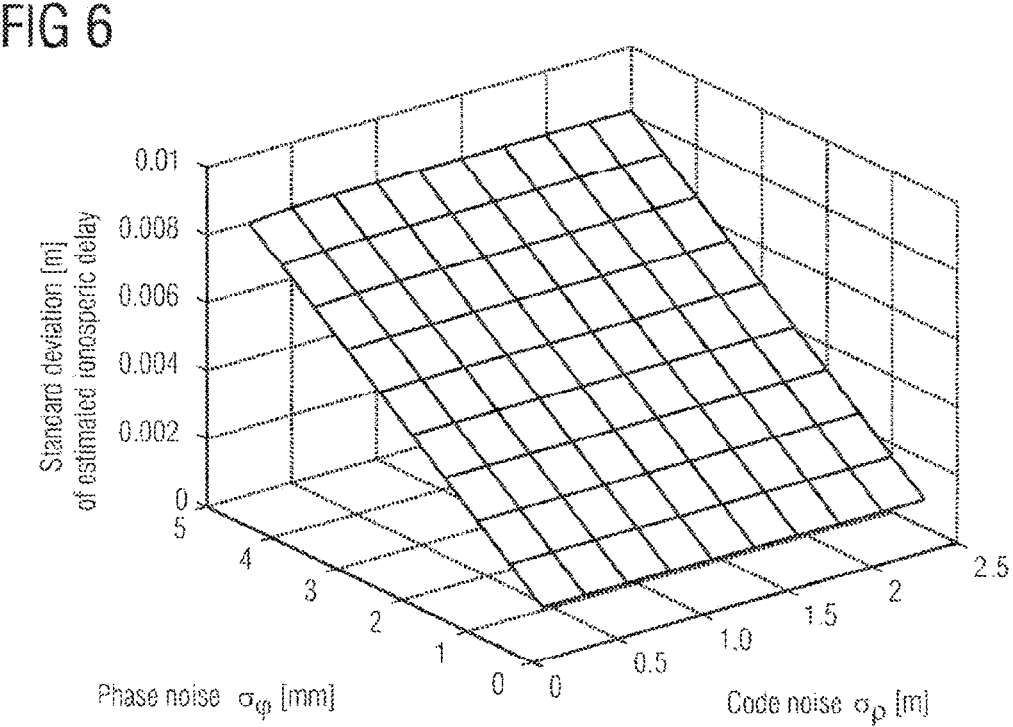
FIG. 6 shows the standard deviation of the estimated ionospheric delay for combined geometry-free and full-geometry linear combinations.

FIG. 6 shows this standard deviation of the ionospheric error as a function of the code and phase noise of single epoch measurements. The variances of ionospheric estimates are equal for all satellites as the geometric portion has been removed previously by combinations. Moreover, $\Sigma_{\hat{I}|\check{N}=N}$ is independent of the applied set, of linear combinations. The accuracy lies in the range of a few millimeters whereas second order effects have been neglected.

The same accuracy might be achieved also with 3F combinations although the earlier steps of ambiguity resolution become more difficult.

7. Optimization of Fault-Ambiguity Detection Capacity

The previous min-max optimization is not the only criterion for selecting the set of linear combinations. It minimizes the probability of wrong fixing of decorrelated ambiguities but it does not take the back-transformations into account.

After rounding the decorrelated ambiguities, two transformations are applied to obtain the elementary ambiguities:

$$\begin{bmatrix} \check{N}_1 \\ \vdots \\ \check{N}_4 \end{bmatrix} = M^{-1}(Z^T)^{-1} \begin{bmatrix} \check{N}'_A \\ \vdots \\ \check{N}'_D \end{bmatrix} \stackrel{!}{\in} \mathbb{Z}. \quad (40)$$

The inverse transformation $M^{-1}(Z^T)^{-1}$ can be used to significantly increase the reliability of ambiguity fixing when small integer offsets in $[\check{N}'_A, \ldots, \check{N}'_D]^T$ result in non-integer values $[\check{N}_1, \ldots, \check{N}_4]^T$. Only the erroneous integer offsets which remain integer valued after back-transformation are critical because in this case the erroneous estimation is not detected.

Therefore the combination matrix M is designed such that the probability of the most likely undetectable offset $P_{MLO}$ is minimized:

$$P_{MLO} = \min_M \max_{\Delta\check{N}' | (M^{-1}(Z^T)^{-1}\Delta\check{N}') \in \mathbb{Z}} P(\Delta\check{N}') \quad (41)$$

with $$P(\Delta\check{N}') = \prod_{i=1}^{4} P(\Delta\check{N}'(i)) = \prod_{i=1}^{4} \int_{\Delta\check{N}'(i)-0.5}^{\Delta\check{N}'(i)+0.5} p(x) dx. \quad (42)$$

and p(x) representing the zero-mean normal distribution with variance $\Sigma_{\check{N}'}(i,i)$. Note that the decorrelation transformation $Z^T$ depends on $\sigma_\psi$, $\sigma_\rho$ and $N_{ep}$ and the coefficient matrix M.

Figure 7:
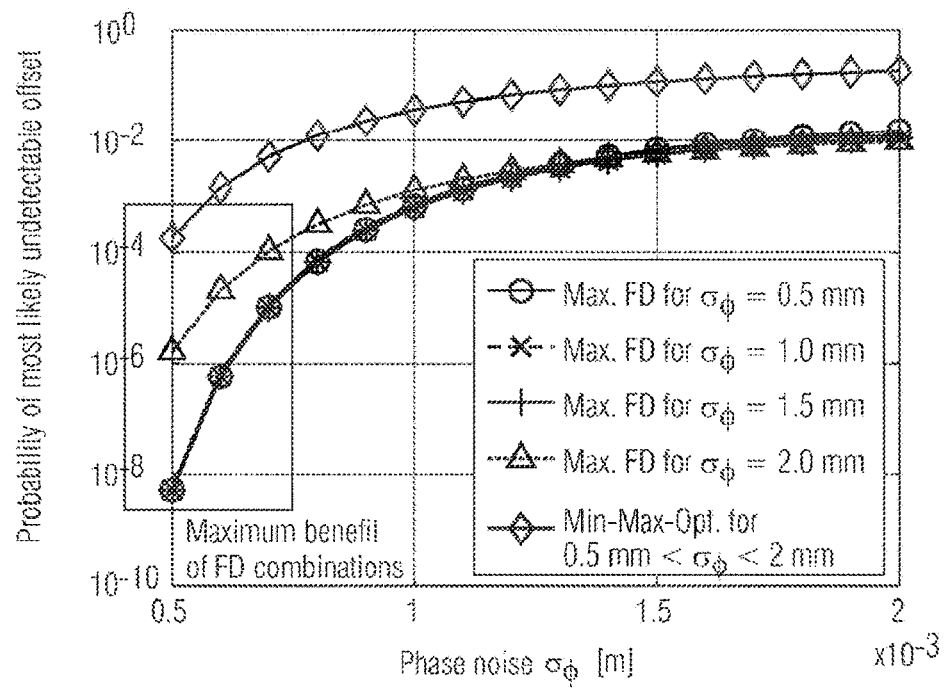
FIG. 7 illustrates the probability of the most likely undetectable ambiguity offset for combinations of geometry-free and full-geometry linear combinations optimized for $\sigma_\rho=1$ m and $N_{ep}=5$.

FIG. 7 shows the $P_{MLO}$ for different maximum Fault Detection (=FD) combinations as a function of phase noise. FIG. 7 shows in particular the probability of most likely undetectable ambiguity offset for combinations of geometry-free and geometry preserving linear combinations optimized for $\sigma_p$=1 m and $N_{ep}$=5. $\sigma_\psi$=0.5 mm, the $P_{MLO} \approx 5.2 \times 10^{-9}$ for FD combinations is more than four orders smaller than the $P_{MLO}$ of minimum variance (equation 35) combinations.

The inverse transformation according to equation (40) might be considered as an analog rate 1 block code with maximum fault detection capacity. This linear code is determined by the parameters $\sigma_\psi$, $\sigma_\rho$ and $N_{ep}$, by the combinations of geometry-free and geometry preserving linear combinations and by the integer constraints on the decorrelation matrix Z. The gain of maximum FD combinations is defined as the ratio between the probability of the most likely undetectable offset of the minimum variance combination set and the probability of the most likely undetectable offset of the maximum FD capacity combination set.

Figure 8:
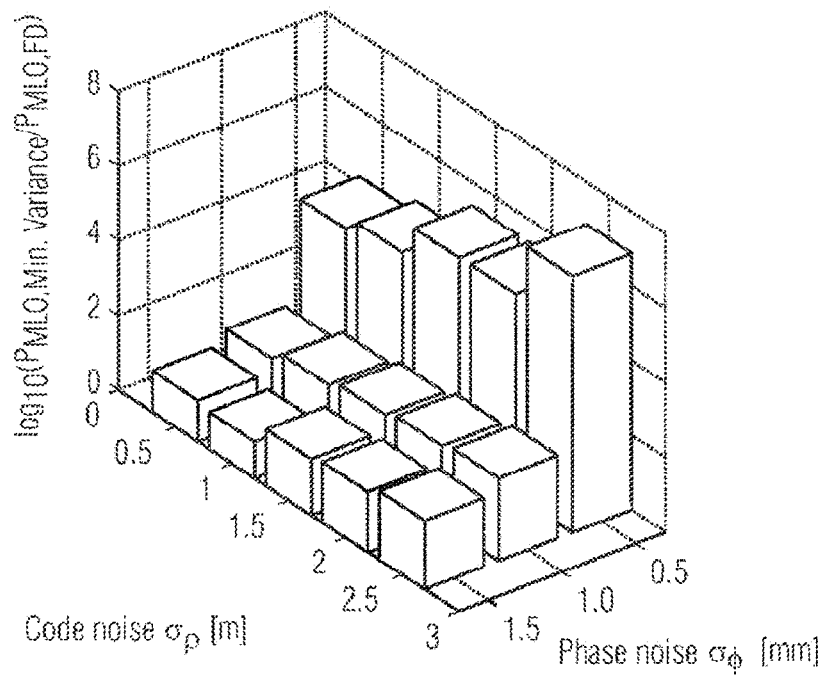
FIG. 8 shows the gain in the overall success rate of maximum fault-detection combinations over minimum variance combinations for $N_{ep}=5$.

FIG. 8 shows this gain as a function of code and phase noise variances. For each set of noise parameters, the two independent optimizations have been performed. Interestingly, the largest gain is visible for small phase noise and large code noise. For $\sigma_\psi$=0.5 mm and $\sigma_\rho$=2.5 m, the most likely undetectable offset is given by $\Delta\check{N}'[1, -2, -1, 0]^T$ for FD combinations and by $\Delta\check{N}'=[1, 0, 0, 0]$ for minimum variance combinations. This results in an overall gain of success rate of $7.3 \times 10^6$.

8. Interactive Fixing with Least-Squares Decorrelation Transformations

Not all decorrelated ambiguities might show a sufficiently low variance for fixing. A first set $M^{(1)}$ of linear combinations optimized for $N_{ep}^{(1)}$ might be used to partially fix the ambiguities, for instance the last one only. The back-transformed ambiguities are then decomposed as:

$$\begin{bmatrix} \hat{N}_A^{(1)} \\ \hat{N}_B^{(1)} \\ \hat{N}_C^{(1)} \\ \hat{N}_D^{(1)} \end{bmatrix} = (Z^{(1),T})^{-1} \cdot \begin{bmatrix} \hat{N}_A'^{(1)} \\ \hat{N}_B'^{(1)} \\ \hat{N}_C'^{(1)} \\ \overline{\hat{N}_D'^{(1)}} \end{bmatrix} \quad (43)$$

$$= P_1^{(1)} \begin{bmatrix} \hat{N}_A'^{(1)} \\ \hat{N}_B'^{(1)} \\ \hat{N}_C'^{(1)} \end{bmatrix} + P_2^{(1)} \check{N}_D'^{(1)}.$$

The fixed ambiguities are subtracted from the measurements which are rewritten as:

$$\tilde{\phi}_{LC}^{(1)} = \phi_{LC}^{(1)} - A^{(1)} P_2^{(1)} \check{N}_D'^{(1)} \quad (44)$$

$$= A^{(1)} P_1^{(1)} \begin{bmatrix} \hat{N}_A'^{(1)} \\ \hat{N}_B'^{(1)} \\ \hat{N}_C'^{(1)} \end{bmatrix} + \Lambda^{(1)} L + \varepsilon^{(1)}$$

with a reduced number of unknowns. Another set $M^{(2)}$ optimized for an increased $N_{ep}$ is used in the second step:

$$\phi_{LC}^{(2)} = A^{(2)} \begin{bmatrix} \hat{N}_A^{(2)} \\ \hat{N}_B^{(2)} \\ \hat{N}_C^{(2)} \\ \hat{N}_D^{(2)} \end{bmatrix} + \Lambda^{(2)} I + \varepsilon^{(2)}. \quad (45)$$

These ambiguities are related to the ambiguities of the first iteration by $$\begin{bmatrix} \hat{N}_A^{(2)} \\ \hat{N}_B^{(2)} \\ \hat{N}_C^{(2)} \\ \hat{N}_D^{(2)} \end{bmatrix} = M^{(2)} \begin{bmatrix} \hat{N}_1 \\ \hat{N}_2 \\ \hat{N}_3 \\ \hat{N}_4 \end{bmatrix} \quad (46)$$

$$= M^{(2)}(M^{(1)})^{-1} \begin{bmatrix} \hat{N}_A^{(1)} \\ \hat{N}_B^{(1)} \\ \hat{N}_C^{(1)} \\ \hat{N}_D^{(1)} \end{bmatrix}.$$

The phase measurements of the second iteration including a priori information from equation (43) are given by $$\phi_{LC}^{(2)} - A^{(2)} M^{(2)} (M^{(1)})^{-1} P_2^{(1)} \check{N}_D'^{(1)} = \quad (47)$$

$$A^{(2)} M^{(2)} (M^{(1)})^{-1} P_1^{(1)} \begin{bmatrix} \hat{N}_A'^{(1)} \\ \hat{N}_B'^{(1)} \\ \hat{N}_C'^{(1)} \end{bmatrix} + \Lambda^{(2)} I + \varepsilon^{(2)}.$$

The use of additional measurements with the combination $M^{(2)}$ reduces the variance of float ambiguities which enables the fixing of further ambiguities. A new decorrelation transformation $Z^{(2),T}$ is computed. Assuming a sufficiently low variance of the $\hat{N}_C''^{(1)}$ estimate, the back-transformation is again decomposed into two parts:

$$\begin{bmatrix} \hat{N}_A'^{(1)} \\ \hat{N}_B'^{(1)} \\ \hat{N}_C'^{(1)} \end{bmatrix} = (Z^{(2),T})^{-1} \cdot \begin{bmatrix} \hat{N}_A''^{(1)} \\ \hat{N}_B''^{(1)} \\ \overline{\hat{N}_C''^{(1)}} \end{bmatrix} \quad (48)$$

$$= P_1^{(2)} \begin{bmatrix} \hat{N}_A''^{(1)} \\ \hat{N}_B''^{(1)} \end{bmatrix} + P_2^{(2)} \check{N}_C''^{(1)}.$$

Further iterations are applied to fix the remaining ambiguities. The main benefit of the suggested iterative ambiguity fixing is the reduced dimension of the decorrelation transformations when additional measurements are taken into account.

9. Second Order Ionospheric Delay Estimation

In this section, a more precise model including the second order ionospheric delay is analyzed: In principle, the combined geometry-free and geometry preserving linear combinations represent an overdetermined system of equations which enables the estimation of integer ambiguities and first and second order ionospheric delays instantaneously. However, the reliability of ambiguities might not be sufficiently high and requires measurements from multiple epochs. Two approaches should be compared: The biased estimation of first order effects without regarding second order effects versus the common estimation of both first and second order ionospheric delays.

The system of equations is given by:

$$\begin{bmatrix} \phi_A \\ \phi_B \\ \phi_C \\ \rho_1 - \phi_D \\ \rho_2 - \phi_D \\ \rho_3 - \phi_D \\ \rho_4 - \phi_D \end{bmatrix} = \quad (49)$$

$$\underbrace{\begin{bmatrix} \lambda_A & 0 & 0 & 0 \\ 0 & \lambda_B & 0 & 0 \\ 0 & 0 & \lambda_C & 0 \\ 0 & 0 & 0 & -\lambda_D \\ 0 & 0 & 0 & -\lambda_D \\ 0 & 0 & 0 & -\lambda_D \\ 0 & 0 & 0 & -\lambda_D \end{bmatrix}}_{A} \cdot \begin{bmatrix} N_A \\ N_B \\ N_C \\ N_D \end{bmatrix} + \underbrace{\begin{bmatrix} -\eta_A^I \\ -\eta_B^I \\ -\eta_C^I \\ 1+\eta_D^I \\ q_{12}^2 + \eta_D^I \\ q_{13}^2 + \eta_D^I \\ q_{14}^2 + \eta_D^I \end{bmatrix}}_{\Lambda^I} \cdot I_1^I + \underbrace{\begin{bmatrix} -\eta_A^{II} \\ -\eta_B^{II} \\ -\eta_C^{II} \\ 1+\eta_D^{II} \\ q_{12}^3 + \eta_D^{II} \\ q_{13}^3 + \eta_D^{II} \\ q_{14}^3 + \eta_D^{II} \end{bmatrix}}_{\Lambda^{II}} \cdot I_1^{II} + \tilde{\varepsilon},$$

where A, B and C denote three geometry-fee combinations and D is the label of the full-geometry combination.

The first and second order ionospheric delays $I_1^I$ and $I_2^{II}$ on L1 are amplified by:

$$\eta_\tau^I = \lambda \cdot \left( \frac{i_r}{\lambda_1} + \frac{j_r}{\lambda_2} \cdot q_{12}^2 + \frac{k_r}{\lambda_3} \cdot q_{13}^2 + \frac{l_r}{\lambda_4} \cdot q_{14}^2 \right) \quad (50)$$

$$\eta_\tau^{II} = \lambda \cdot \left( \frac{i_r}{\lambda_1} + \frac{j_r}{\lambda_2} \cdot q_{12}^3 + \frac{k_r}{\lambda_3} \cdot q_{13}^3 + \frac{l_r}{\lambda_4} \cdot q_{14}^3 \right)$$

with r∈{A,B,C,D}

The bias of first order ionospheric estimation due to negligence of second order effects is given by $$A^{II} \cdot I_1^{II} = (\Lambda^{I^T} \Sigma^{-1} \Lambda^I)^{-1} \Lambda_I^T \Sigma^{-1} \Lambda^{II} \cdot I_1^{II}. \quad (51)$$

Figure 9:
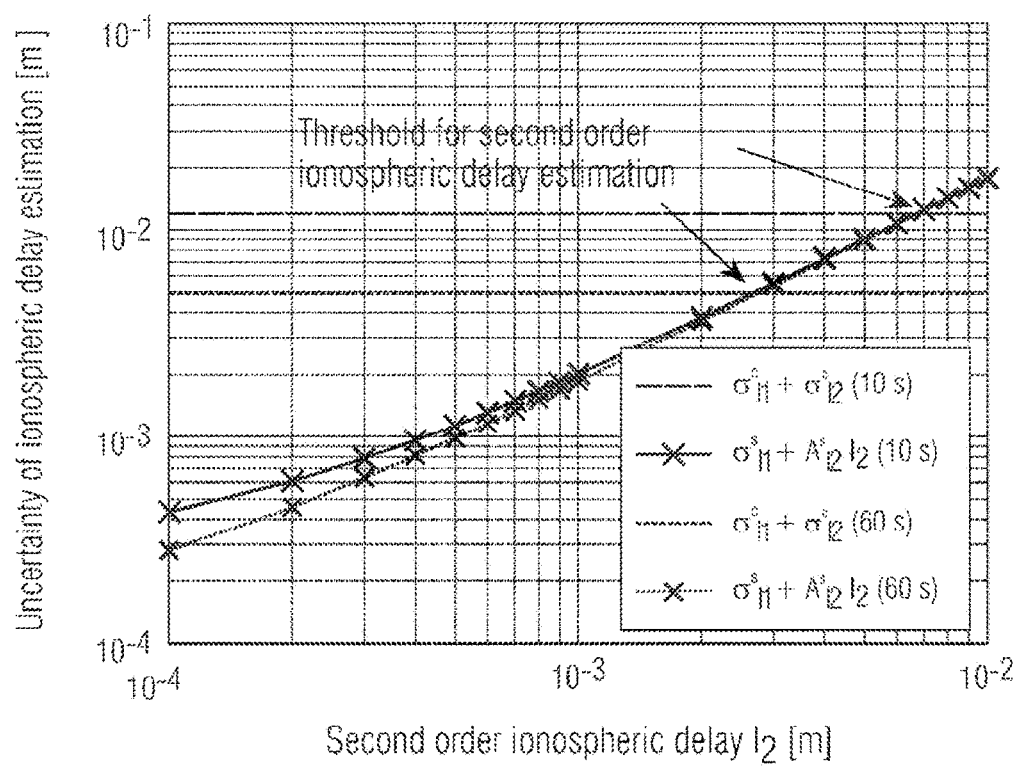
FIG. 9 shows the estimation of both first and second order ionospheric delays for $\sigma_\psi=1$ mm and $\sigma_\rho=1$ m.

FIG. 9 illustrates the necessity of second order ionospheric delay estimation. FIG. 9 shows the estimation of both first and second order ionospheric delays for $\sigma_\psi=1$ mm and $\sigma_\rho=1$ m.

Assuming 1 Hz measurements over a 10 s period, an estimation of $I_2$ is beneficial only if $I_1 \approx 1000 \cdot I_2 \geq 7$ m. Alternatively, geometry-free combinations could be selected such that the second order ionospheric delay is minimized (Table IV). The maximum reduction over second order effects on L1 amounts to 11.1 dB for $\lambda=0.20$ m.

10. Processing of Navigation Signals

Figure 10:
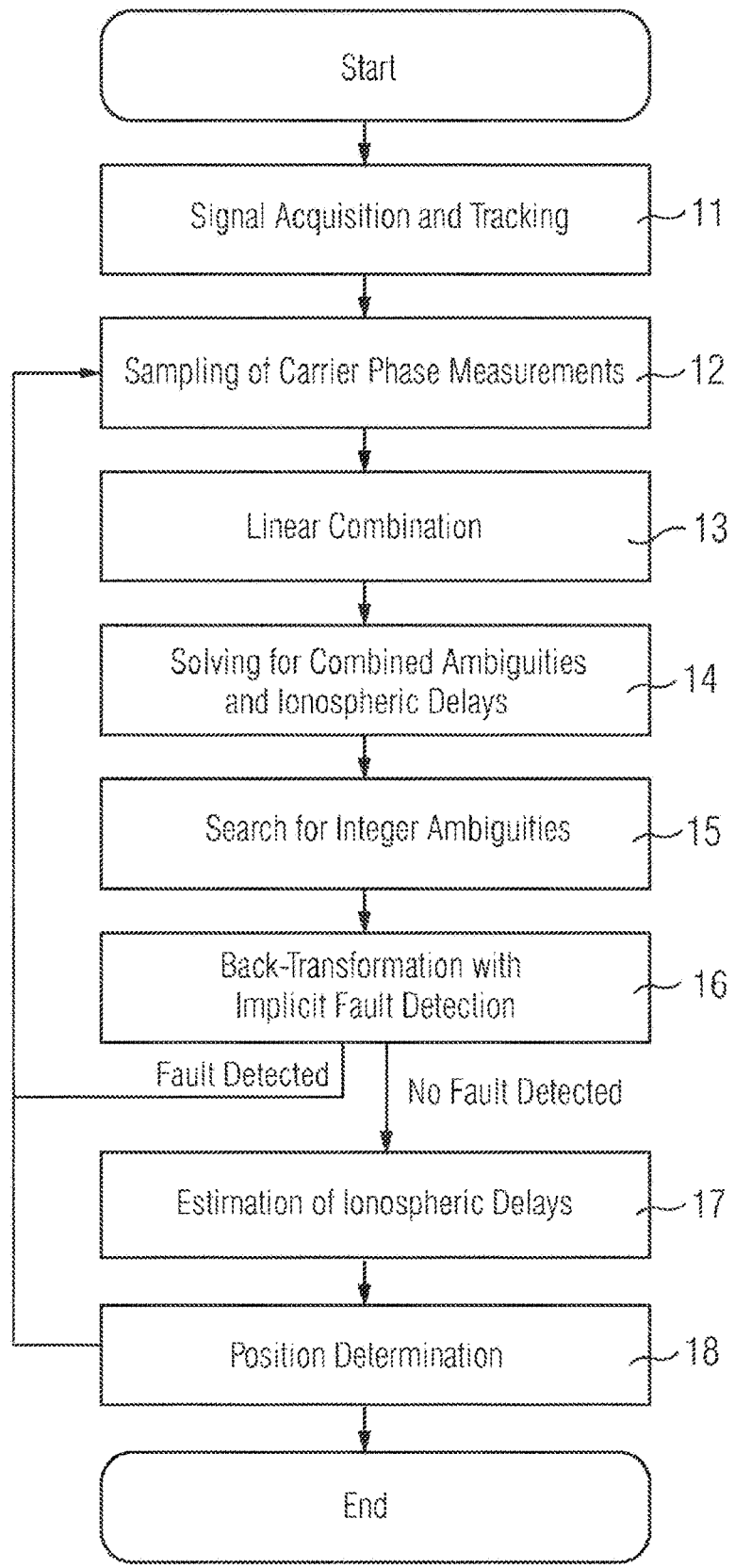
FIG. 10 is a flow chart of a method for determining the position of a navigation device using geometry-free linear combination of the carrier signals.

An overview on a method for processing navigation signals is shown in FIG. 10 which contains a flow chart of a method for processing navigation signals.

The method starts with acquisition and tracking 11 of the carrier signals 4. During this method step the phase of the carrier signals 4 are continuously received and tracked, so that the phasings of the carrier signals must only be determined once. In practice, however, the phasings are determined repeatedly so that errors during the acquisition and tracking process 11 can be eliminated.

In the next step a sampling 12 takes place in which the phase measurements of at least one epoch are sampled. Then combined signals are formed by a geometry preserving or geometry-free linear combination 13 of various carrier phase signals. Further on, the combined phase ambiguities and the ionospheric delays are determined by solving 14 a phase equation system similar to equation (28) by a least-square method. The solving 14 not necessarily results in integer numbers for the phase ambiguity but generally in reel numbers. Therefore, suitable integer phase ambiguities must be determined in a search 15 for corresponding integer valued phase ambiguities. The search 15 can be performed, for instance, by using the LAMBDA-algorithm.

In the following, a back-transformation 16 according to equation (40) is applied to the combined phase ambiguities in order to retrieve the elementary phase ambiguities. The back-transformation 16 implies a fault detection. If a fault is detected the sampling 12 of the phase measurements 12 and subsequent method steps are repeated in order to determine a new set of phase ambiguities.

If no fault is detected the process can be continued by a precise estimation 17 of the first order and eventually second order ionospheric delays.

Finally a determination 18 of the position of the navigation device 5 is completed using the knowledge of the integer ambiguities and the ionospheric delay. The determination 18 can be based on the elementary carrier signals 4 or on geometry preserving linear combinations of the elementary carrier signals 4.

Since the ionospheric error is known the determination 18 of the position can use a method resulting in the absolute position of the navigation device 5. In particular, there is no need to apply the double difference method for suppressing the ionospheric error.

The integer ambiguities can always not be solved directly from stand alone carrier phase measurements of a single epoch due to an underdetermined equation system. Therefore, the measurements of further epochs may have to be taken into account.

11. Advantages

In cascade integer ambiguity resolution, the ranges (or baseline) have to be estimated in each step although they represent a nuisance parameter in all steps except the last one. The proposed geometry-free combinations eliminate the geometry and are especially useful for absolute positioning as orbital errors, troposphere and clock errors are eliminated.

This enables the estimation of integer ambiguities and of ionospheric delays by a modified LAMBDA algorithm: The baseline is replaced by the ionosphere and the correlation is caused by multiple linear combinations instead of double differences. The accuracy of the ionospheric delay estimation is only limited by the phase noise and carrier phase multipath. Geometry-free combinations are designed such that the integer nature of the linear combined ambiguities is maintained. Two criteria have been compared for the selection of linear combinations. The first one minimizes the variances of decorrelated ambiguities which results in a minimum probability of wrong rounding. The second one maximizes the overall success rate and takes the back-transformations due to decorrelation and linear combinations into account. The later approach enables the detection of wrong fixings which reduces the error rate by up to six orders of magnitude. The combination of geometry-free and geometry preserving combinations provides additional degrees of freedom that allows the estimation of both first and second order ionospheric delays.

Although the concept has been discussed in detail with respect to the Galileo satellite system, the proposed concept can also be extended to the GPS navigation system. Table V contains GPS geometry-free combinations which might be used accordingly.

The concept can furthermore also be extended to the Glonass satellite system or any other present or future satellite navigation system with at least three carrier signals. The concept can finally also applied to so called pseudolites which are pseudo satellites typically implemented as ground based transmitter that broadcast a signal corresponding to the signals of the satellites 2 of the satellite navigation system 1.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith.

TABLE 1

Integer Coeficients for Selected 3F Geometry-Free Linear Combinations (L1, E5B, E5A Frequencies)

| i | j | k | $A_n/\lambda$ [1/m] | $A_I/\lambda$ [1/m] | |
|---|---|---|---|---|---|
| 1 | -13 | 12 | 70.60 | 0.54 | ← C |
| 9 | -2 | -10 | 61.98 | 36.79 | |
| 10 | -15 | 2 | 80.44 | 36.24 | |

TABLE II

Integer Coeficients for Selected 4F Geometry-Free Linear Combinations (L1, E5B, E5A, E6 Frequencies)

| i | j | k | l | $A_n/\lambda$ [1/m] | $A_I/\lambda$ [1/m] | |
|---|---|---|---|---|---|---|
| 1 | -3 | 5 | -3 | 26.87 | 0.44 | ← A |
| 1 | 7 | -2 | -6 | 39.22 | 0.34 | |
| 2 | 4 | 3 | -9 | 44.52 | 0.78 | |
| 0 | 10 | -7 | -3 | 50.39 | 0.10 | ← B |
| 3 | 1 | 8 | -12 | 62.21 | 1.23 | |
| 1 | -13 | 12 | 0 | 70.60 | 0.54 | |
| 3 | -4 | -1 | 1 | 23.27 | 12.23 | |
| 2 | -1 | -6 | 4 | 31.17 | 12.67 | |
| 4 | 3 | -3 | -5 | 34.36 | 11.88 | |
| 4 | -7 | 4 | -2 | 39.43 | 11.78 | |
| 3 | 6 | -8 | -2 | 43.48 | 12.33 | |
| 5 | 0 | 2 | -8 | 43.77 | 11.44 | |
| 7 | -1 | -4 | -4 | 43.66 | 24.11 | |
| 5 | -5 | -7 | 5 | 48.01 | 24.90 | |
| 6 | 2 | -9 | -1 | 48.21 | 24.56 | |

TABLE III

Integer Coefficients for 4F (L1, E6, E5B, E5A) Full-Geometry Widelane Combinations with Minimum Noise Amplification.

| i | j | k | l | λ | $A_n$| dB | $A_I$| dB |
|---|---|---|---|---|---|---|
| 0 | 1 | -3 | 2 | 29.305 | 26.43 | -1.14 |
| 1 | -4 | 1 | 2 | 14.652 | 24.65 | 6.29 |
| 0 | 0 | 1 | -1 | 9.768 | 17.39 | 2.42 |
| 0 | 1 | -2 | 1 | 7.326 | 18.61 | 1.76 |
| 1 | -4 | 2 | 1 | 5.861 | 20.68 | -1.83 |
| 1 | -3 | -1 | 3 | 4.884 | 19.58 | -3.78 |
| 0 | 1 | -1 | 0 | 4.186 | 13.90 | 2.06 |
| -3 | 1 | 0 | 3 | 3.663 | 18.67 | 16.36 |
| 1 | -3 | 0 | 2 | 3.256 | 17.14 | -5.17 |
| 0 | 1 | 0 | -1 | 2.930 | 12.30 | 2.17 |
| 0 | 2 | -3 | 1 | 2.664 | 16.10 | 1.95 |
| 1 | -3 | 1 | 1 | 2.442 | 15.61 | -1.77 |
| 0 | 1 | 1 | -2 | 2.254 | 13.44 | 2.33 |
| -3 | 1 | 2 | 1 | 2.093 | 15.90 | 13.80 |
| 1 | -3 | 2 | 0 | 1.953 | 14.95 | -0.54 |
| 1 | -2 | -1 | 2 | 1.831 | 13.88 | -0.58 |
| 0 | 2 | -1 | -1 | 1.723 | 12.45 | 2.12 |
| 1 | -3 | 3 | -1 | 1.628 | 14.85 | 0.10 |
| 1 | -2 | 0 | 1 | 1.542 | 12.20 | 0.05 |
| 1 | -1 | -3 | 3 | 1.465 | 14.25 | -0.00 |
| -3 | 2 | 1 | 1 | 1.395 | 14.18 | 11.89 |
| 1 | -2 | 1 | 0 | 1.332 | 11.57 | 0.46 |
| 1 | -1 | -2 | 2 | 1.274 | 12.23 | 0.40 |
| 0 | 3 | -2 | -1 | 1.221 | 12.80 | 2.10 |
| 1 | -2 | 2 | -1 | 1.172 | 11.97 | 0.75 |
| 1 | -1 | -1 | 1 | 1.127 | 9.96 | 0.69 |
| 0 | 3 | -1 | -2 | 1.085 | 12.27 | 2.14 |
| 1 | -2 | 3 | -2 | 1.046 | 12.64 | 0.96 |

TABLE III-continued

Integer Coefficients for 4F (L1, E6, E5B, E5A) Full-Geometry Widelane Combinations with Minimum Noise Amplification.

| i | j | k | l | λ | $A_n$| dB | $A_I$| dB |
|---|---|---|---|---|---|---|
| 1 | -1 | 0 | 0 | 1.010 | 8.35 | 0.90 |

TABLE IV

4F Geometry-free Combinations of Minimum Second Order Ionospheric Delay for λ = 0.20 m.

| i(L1) | j(E6) | k(E5b) | l(E5a) | $|\eta_r^{II}|$ in dB |
|---|---|---|---|---|
| 0 | 3 | -10 | 7 | -11.1 |
| -1 | 12 | -27 | 16 | -10.7 |
| -1 | 9 | -17 | 9 | -7.9 |
| -1 | 6 | -7 | 2 | -6.2 |
| -1 | 3 | 3 | -5 | -5.0 |

TABLE V 3F (L1, L2, L5) GPS geometry-free combinations

| i | j | k | AI/λ [1/m] | AN/λ [1/m] |
|---|---|---|---|---|
| 5 | -39 | 40 | 2.52 | 209.75 |
| 5 | -16 | 10 | 11.25 | 80.76 |
| 0 | 23 | -24 | 13.78 | 133.19 |
| 5 | 7 | -14 | 25.03 | 67.30 |
| 10 | -9 | -4 | 36.29 | 66.07 |
| 15 | -25 | 6 | 47.55 | 131.33 |
| 15 | -2 | -18 | 61.33 | 106.16 |

What is claimed is:

1. A navigation device for a global navigation satellite system, which is arranged for processing a set of navigation signals of a global navigation satellite system with at least three carrier signals by a processor in which the processing of the navigation signals is based on a linear combination of phase measurements of the at least three carrier signals to a combined phase signal, wherein a phase ambiguity of the combined phase signal is an integer multiple of a combined wavelength associated with the combined phase signal, wherein the combined phase signal is free from geometry and free from frequency-independent disturbance variables, wherein N phase measurements $\phi_i$ of the carrier signals with wavelength $\lambda_i$ are combined to form a geometry-free combination using the weighting coefficients $\alpha_i$ according to:

$$\phi_{LC} = \sum_{i=1}^{N \geq 3} \alpha_i \phi_i$$

with $$\alpha_i = \frac{n_i \lambda}{\lambda_i}$$

and $$\sum_{i=1}^{N \geq 3} \alpha_i = 0$$

$n_i$ being integer numbers.

2. The navigation device according to claim 1,
wherein the tropospheric error, the clock errors of a navigation device and of the satellites as well as the orbital error of the satellites are eliminated by the linear combination.

3. The navigation device according to claim 1,
wherein a combination matrix containing the weighting coefficients of the linear combinations of the carrier signals has a rank corresponding to the number of combined phase signals.

4. The navigation device according to claim 3,
wherein N−1 geometry-free linear combinations of N phase measurements of the carrier signals are used together with at least one difference measurement containing the phase difference between a geometry conserving phase measurement and a code measurement.

5. The navigation device according to claim 4,
wherein the phase ambiguity and the ionospheric error are estimated by minimizing a norm with respect to an inverse covariance matrix of the measurements.

6. The navigation device according to claim 5,
wherein the estimated phase ambiguities of the combined phase measurements are decorrelated by seeking for a decorrelation transformation minimizing the off-diagonal elements of a covariance matrix of the estimated phase ambiguities and conserving integrity during back transformation.

7. The navigation device according to claim 6,
wherein the decorrelated phase ambiguities are rounded to integer numbers and back-transformed by the inverse matrix of the decorrelation transformation.

8. The navigation device according to claim 6,
wherein a combination matrix, which minimizes the maximum variance of the de-correlated estimated phase ambiguities, is used for the linear combination of the phase measurements.

9. The navigation device according to claim 6,
wherein a combination matrix, which minimizes the probability for the non-detection of an erroneous estimation after back-transforming the decorrelated integer phase ambiguities, is used for the linear combination of the phase measurements.

10. The navigation device according to claim 6, wherein the phase ambiguity is fixed if the variance of the decorrelated phase ambiguities lies below a predetermined threshold value and wherein further phase measurements are used to estimate the remaining phase ambiguities.

11. The navigation device according to claim 5,
wherein the influence of neglecting a second order ionospheric error on the estimation of the first order ionospheric error is checked and that the second order ionospheric error is estimated if the negligence of the second order ionospheric error results in an error of the estimation of the first order ionospheric error which surpasses the error of the estimation of the first order ionospheric error if both ionospheric errors are taken into account.

12. The navigation device according to claim 4,
wherein the N phase measurements $\phi_i$ of the carrier signals with wavelength $\lambda_i$ are combined to form a full-geometry combination using the weighting coefficients $\alpha_i$ according to:

$$\phi_{LC} = \sum_{i=1}^{N \geq 3} \alpha_i \phi_i$$

with $$\alpha_i = \frac{n_i \lambda}{\lambda_i},$$

$$\sum_{i=1}^{N \geq 3} \alpha_i = \tau$$

and $$\frac{\tau}{\lambda} = \sum_{i=1}^{N \geq 3} \frac{n_i}{\lambda_i}$$

$n_i$ being integer numbers and $\tau \geq 1$.

13. The navigation device according to claim 12,
wherein N=4 and the carrier signals are the L1, E5b, E5a and E6 bands of the Galileo system and
wherein the integer numbers $n_i$ for the full-geometry combinations are selected from the quadruples
(0, 1, −3, 2), (1, −4, 1, 2), (0, 0, 1, −1)
(0, 1, −2, 1), (1, −4, 2, 1), (1, −3, −1, 3)
(0, 1, −1, 0), (−3, 1, 0, 3), (1, −3, 0, 2)
(0, 1, 0, −1), (0, 2, −3, 1), (1, −3, 1, 1)
(0, 1, 1, −2), (−3, 1, 2, 1), (1, −3, 2, 0)
(1, −2, −1, 2), (0, 2, −1, −1), (1, −3, 3, −1)
(1, −2, 0, 1), (1, −1, −3, 3), (−3, 2, 1, 1)
(1, −2, 1, 0), (1, −1, −2, 2), (0, 3, −2, −1)
(1, −2, 2, −1), (1, −1, −1, 1), (0, 3, −1, −2)
(1, −2, 3, −2), (1, −1, 0, 0).

14. The navigation device according to claim 1,
wherein N=3 and that the carrier signals are the L1, E5b and E5a bands of the Galileo system.

15. The navigation device according to claim 14,
wherein the integer numbers $n_i$ for the geometry-free combinations are selected from the triples
(1,−13,12), (9,−2,−10) and (10,−15,2).

16. The navigation device according to claim 1,
wherein N=4 and that the carrier signals are the L1, E5b, E5a and E6 bands of the Galileo system.

17. The navigation device according to claim 16,
wherein the integer numbers n, for the geometry-free combinations are selected from the quadruples
(1, −3, 5, −3), (1, 7, −2, −6), (2, 4, 3, −9)
(0, 10, −7, −3), (3, 1, 8, −12), (1, −13, 12, 0)
(3, −4, −1, 1), (2, −1, −6, 4), (4, 3, −3, −5)
(4, −7, 4, −2), (3, 6, −8, −2), (5, 0, 2, −8)
(7, −1, −4, −4), (5, −5, −7, 5), (6, 2, −9, −1)
(0, 3, −10, 7), (−1, 12, −27, 16), (−1, 9, −17, 9)
(−1, 6, −7, 2), (−1, 3, 3, −5).

18. The navigation device according to claim 1,
wherein N=3 and wherein the carrier signals are the L1, L2 and L5 bands of the Galileo system.

19. The navigation device according to claim 18,
wherein the integer numbers $n_i$ for the geometry-free combinations are selected from the triples
(5, −39, 40), (5, −16, 10), (0, 23, −24),
(5, 7, −14), (10, −9, −4), (15, −25, 6)
(15, −2, −18).

20. A navigation device for a global navigation satellite system, which is arranged for processing a set of navigation signals of a global navigation satellite system with at least three carrier signals by a processor
in which the processing of the navigation signals is based on a linear combination of phase measurements of the at least three carrier signals to a combined phase signal, wherein a phase ambiguity of the combined phase signal is an integer multiple of a combined wavelength associated with the combined phase signal, wherein the combined phase signal is free from geometry and free from frequency-independent disturbance variables, and wherein N−1 geometry-free linear combinations of N phase measurements of the carrier signals are used together with at least one difference measurement containing the phase difference between a geometry conserving phase measurement and a code measurement.

21. A navigation device for a global navigation satellite system, which is arranged for processing a set of navigation signals of a global navigation satellite system with at least three carrier signals by a processor
in which the processing of the navigation signals is based on a linear combination of phase measurements of the at least three carrier signals to a combined phase signal,
wherein a phase ambiguity of the combined phase signal is an integer multiple of a combined wavelength associated with the combined phase signal, and
wherein the combined phase signal is free from geometry and free from frequency-independent disturbance variables before determining the ambiguities of the combined phase signal and the ionospheric delay.

* * * * *